(12) United States Patent
Ogino

(10) Patent No.: US 7,120,734 B2
(45) Date of Patent: Oct. 10, 2006

(54) SIGNAL PROCESSING CIRCUIT FOR OPTICAL DISK PLAYER HAVING A SHARED MEMORY FOR BOTH AN ANTI-SHOCK MECHANISM AND A CD-ROM DECODER

(75) Inventor: Naoyuki Ogino, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/893,032

(22) Filed: Jun. 26, 2001

(65) Prior Publication Data

US 2002/0019906 A1   Feb. 14, 2002

(30) Foreign Application Priority Data

Jun. 30, 2000   (JP)   ............................ 2000-198164

(51) Int. Cl.
*G06F 12/00* (2006.01)
(52) U.S. Cl. ..................................... 711/111
(58) Field of Classification Search ................ 711/112; 360/7
See application file for complete search history.

(56) References Cited

U.S. PATENT DOCUMENTS 5,508,983 A * 4/1996 Nakamura et al. ........ 369/47.31
5,818,801 A * 10/1998 Watanabe et al. ......... 369/30.23
6,292,440 B1 * 9/2001 Lee ............................... 369/7
2002/0001267 A1 * 1/2002 Lee ........................... 369/47.33

FOREIGN PATENT DOCUMENTS

JP   63-245551   12/1988
JP   9-017117    1/1997

OTHER PUBLICATIONS

Microsoft Computer Dictionary, 1999, Microsoft Press, Fourth Edition, pp. 159 and 379.*

* cited by examiner

*Primary Examiner*—Mano Padmanabhan
*Assistant Examiner*—Midys Rojas
(74) *Attorney, Agent, or Firm*—Hogan & Hartson LLP

(57) ABSTRACT

An external memory (16) is accessed by either a CD-ROM decoder (10) or an anti-shock controller (12) through an interface. Thus, a single memory can be shared for two purposes, allowing both audio data and MP3 data to be reproduced in an efficient manner.

13 Claims, 2 Drawing Sheets

SIGNAL PROCESSING CIRCUIT FOR OPTICAL DISK PLAYER HAVING A SHARED MEMORY FOR BOTH AN ANTI-SHOCK MECHANISM AND A CD-ROM DECODER

BACKGROUND OF THE INVENTION

1. Field of the Invention

The present invention relates to a signal processing circuit for use in a CD reproducing device for reproducing both CD-ROM data and audio data.

2. Description of the Related Art

Portable CD players are widely used as use of audio CDs is increased. Because the portable CD players are susceptible to external shocks which often result in reading errors, the players are usually provided with an anti-shock function.

Meanwhile, MP3 (MPEG Audio Layer-3; MPEG stands for Moving Picture Experts Group), an encoding format of audio data, is gaining widespread use. Such MP3 data is utilized in a manner that, for example, audio data encoded in MP3 format for compression using a personal computer is exchanged via Internet or the like, and that users enjoy music obtained by decoding the data in real time on the computer.

However, with widespread use of CD-Rs and CD-RWs, users increasingly enjoy music by playing a CD in which MP3 data is written as CD-ROM data with a player, and therefore attempts to provide a portable CD player with a function of playing a CD with MP3 data written therein are beginning to be made.

The anti-shock function is performed by storing a predetermined amount of read out audio data in a memory and outputting the audio data read out from the memory so that audio data can be continuously output even when the incoming audio data is interrupted. Thus, the memory for storing audio data is required to perform such a function. A memory is also required for the purpose of temporarily storing data during the process of decoding CD-ROM data read out from the CD. When a CD player for automobiles are provided with the anti-shock function, memories are required for the anti-shock function and CD-ROM decoding, as in the portable CDS.

SUMMARY OF THE INVENTION

An object of the present invention is to provide a signal processing circuit allowing efficient use of a memory.

The present invention relates to a signal processing circuit for processing a signal reproduced from a CD, comprising CD-ROM decoding means for decoding incoming CD-ROM data by using a memory, and anti-shock controlling means for causing a predetermined amount of incoming audio data to be stored in the memory, and reading and outputting the audio data from the memory, so that continuous output can be achieved even when the incoming audio data is interrupted, wherein said CD-ROM decoding means and said anti-shock controlling means use the same memory.

Thus, a single memory can be used as a memory for decoding the CD-ROM data and a memory for the anti-shock function, thereby allowing efficient use of the memory.

Further, MP3 decoding means is preferably provided for decoding data, encoded in MP3 format and supplied from the CD-ROM decoding means, in MP3 format, thereby allowing reproduction of both an audio CD and a CD with MP3 data.

DESCRIPTION OF PREFERRED EMBODIMENTS

Preferred embodiments of the present invention will next be described with reference to the accompanying drawings.

Figure 1:
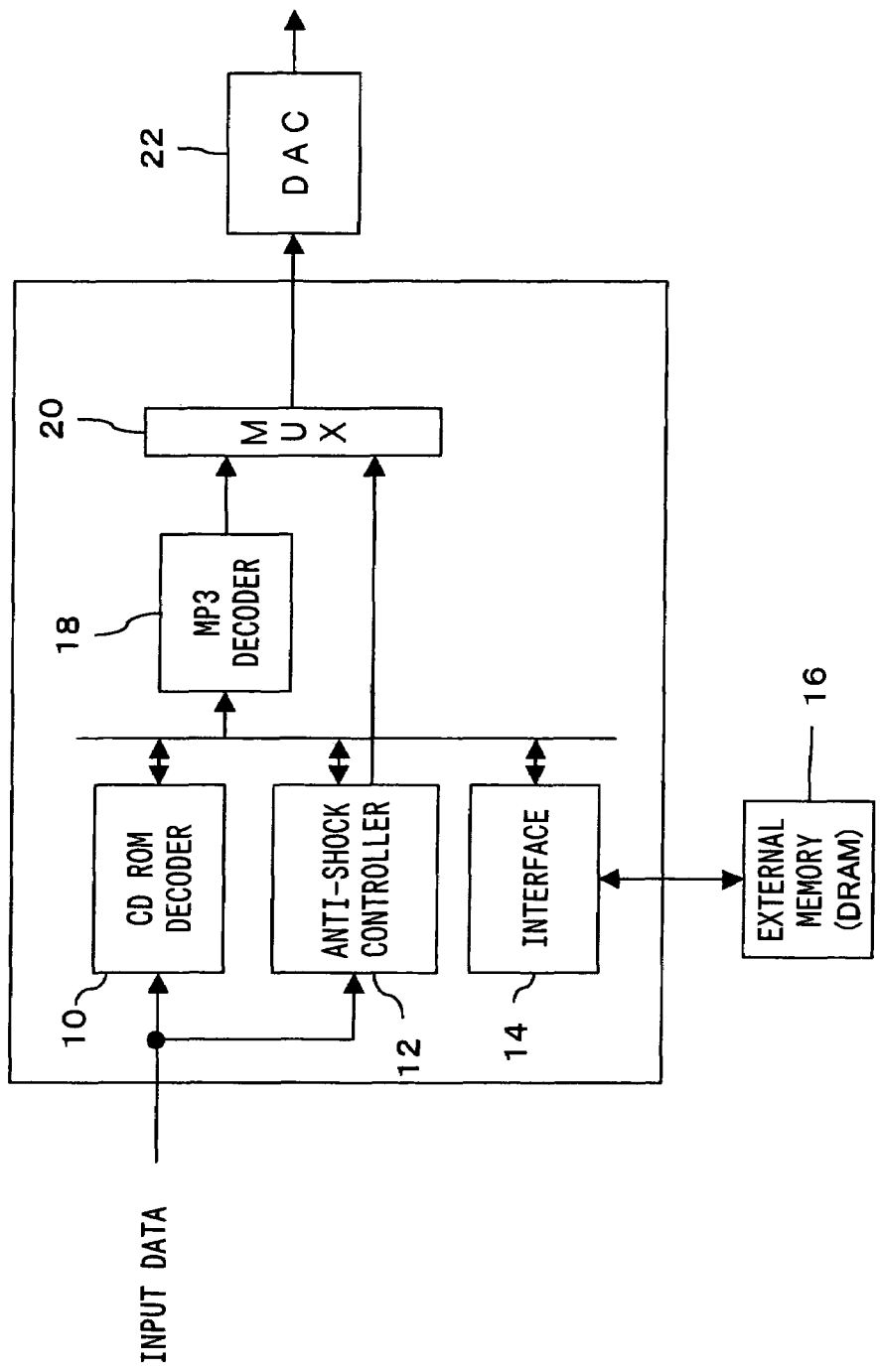
FIG. 1 is a diagram illustrating a configuration of a signal processing circuit according to an embodiment of the invention.

FIG. 1 is a diagram illustrating a configuration of a signal processing circuit according to an embodiment of the present invention. A signal read out from a CD is processed to digital data. CD-ROM data is supplied to a CD-ROM decoder 10, while CDDA data, which is audio data, is supplied to an anti-shock controller 12. Such data identification is performed by an external microcomputer or the like based on the content of the readout signal, and the element receiving the data is determined based on the identified result.

The CD-ROM decoder 10 decodes the data read out from the CD (digital data), and supplies MP3-encoded data. During such a decoding process, the CD-ROM decoder 10 requires a memory for temporarily storing data for the sake of buffering the incoming data or checking and correcting errors. Therefore, the CD-ROM decoder 10 is connected to an external memory 16 through an interface 14.

Meanwhile, CDDA data is supplied to the anti-shock controller 12, which writes data in the external memory 16 through the interface 14 and sequentially supplies data read out from the external memory 16. When an error occurs in reading data from the CD due to external impact, the anti-shock controller 12 calculates and outputs the address at the moment before the reading error, and the data corresponding to the moment the reading error occurred is read out again. On the other hand, non-erroneous data is continuously read out from the external memory 16.

The MP3-encoded data from the CD-ROM decoder 10 is supplied to an MP3 decoder 18, which makes a reading request to the CD-ROM decoder 10, receives the data read out from the external memory 16, and decompresses it to the original data. Through MP3 decoding, audio data similar to CDDA can be obtained.

The audio data from the MP3 decoder 18 and the audio data from the anti-shock controller 12 are supplied to a selection circuit (MUX) 20, which selects one of the two data items.

An output from the selection circuit 20 is supplied to a DAC (digital-analog converter) 22, which converts it to analog audio signals to obtain audio signals for reproduction.

According to this embodiment, the CD-ROM decoder 10, the anti-shock controller 12, the interface 14, the MP3 decoder 18, and the selection circuit 20 are mounted on a one-chip LSI, to which an identification signal indicating whether the input data is CD-ROM data or CDDA data is supplied to control data processing and output.

Figure 2:
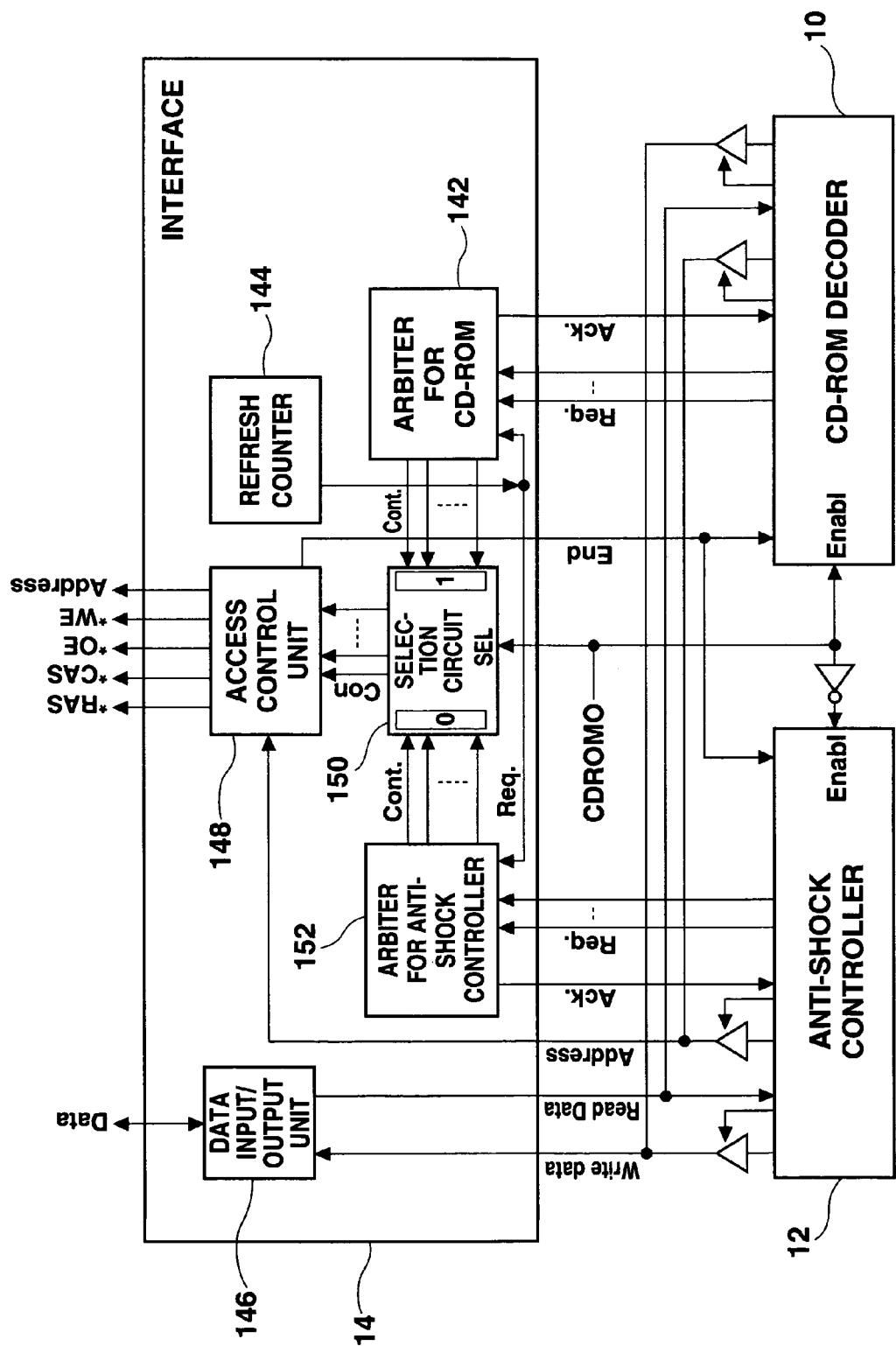
FIG. 2 is a diagram illustrating a configuration of an interface circuit.

FIG. 2 illustrates a configuration of the interface 14, and signal exchange between the interface 14 and the CD-ROM decoder 10 and the anti-shock controller 12.

An identification signal CDROMO is supplied from an external source to the interface 14, the CD-ROM decoder 10, and the anti-shock controller 12. The signal CDROMO indicates whether the incoming signal is CD-ROM data or CDDA data.

When the input data is CD-ROM data, the signal CDROMO enables the CD-ROM decoder. The CD-ROM decoder initiates a process for decoding the incoming CD-ROM data, and supplies a request signal Req to the interface 14 when data writing is necessary. The request signal Req is supplied to an arbiter 142 for CD-ROMs provided in the interface 14. The CD-ROM arbiter 142 also receives a signal regarding refresh timing of the external memory (DRAM) 16 from a refresh counter 144 provided in the interface 14, and supplies a control signal for writing to a selection circuit 150 at writable timing. The CD-ROM decoder 10 supplies write data to the external memory 16 through a data input unit 146 provided in the interface 14. The write address is supplied to an access control unit 148 in the interface 14 from the CD-ROM decoder 10.

An arbiter 152 for the anti-shock controller is also provided for the selection circuit (multiplexer MUX) 150. The selection circuit 150 receives the identification signal CDROMO, and supplies a control signal for memory access received from the CD-ROM arbiter 142 to the access control unit 148 when CD-ROM data is input.

Thus, RAS and CAS signals necessary for an access to the external memory or DRAM 16 in row and column directions, and Address and Write Enable (WE) signals necessary for an access to the external memory 16 are output from the access control unit 148. Consequently, data supplied from the CD-ROM decoder 10 to the external memory 16 through the data input/output unit 146 is written in a specified address.

When a need for data readout from the external memory 16 arises in the CD-ROM decoder 10, the decoder 10 supplies a readout request signal to the CD-ROM arbiter 142, which supplies a control signal to the access control unit 148 through the selection circuit 150 at predetermined timing. It should be noted that the CD-ROM decoder 10 outputs a plurality of request signals for reading/writing data, such as CD-ROM data, subcode signals, error flags for error correction, and the like, or for processing such data for other purposes. The CD-ROM arbiter 142 outputs a plurality of control signals in the order of priority in accordance with such request signals or a readout request (not shown) received from the MP3 decoder 18. The access control unit 148 supplies an output enable signal OE, and RAS, CAS, and Address signals to the external memory 16, and data at the specified address is output to the CD-ROM decoder 10 through the data input/output unit 146.

When CDDA data is input, the anti-shock controller 12 assumes an operation enable state in accordance with the identification signal CDROMO. For an access to the external memory 16, the request signal Req is supplied from the controller 12 to the anti-shock controller arbiter 152, and the selection circuit 150 selects the anti-shock controller arbiter 152 in accordance with the identification signal CDROMO. A control signal is supplied from the anti-shock controller arbiter 152 to the access control unit 148 through the selection circuit 150. It should be noted that the anti-shock controller 12 outputs a plurality of request signals for reading and writing data, such as CDDA data, subcode signals, error flags, and the like, or for processing such data for other purposes. The anti-shock controller arbiter 152 outputs a plurality of control signals corresponding to the request signals. The write enable signal WE and the output enable signal OE are supplied to the external memory 16 for writing and reading, respectively. The anti-shock controller 12 supplies write data to the external memory 16 through the data input/output unit for writing, and acquires data from the external memory 16 through the data input/output unit 146 for reading. Thus, input data from the anti-shock controller 12 can be written into the external memory 16, and data written in the external memory 16 can be read out.

As described above, according to this embodiment, a single memory, namely the external memory 16, can be utilized for both reading and writing of CD-ROM data necessary for the CD-ROM decoder 10, and reading and writing of CDDA data for the anti-shock controller 12.

The external memory 16 is addressed by dividing the external memory 16 into two memory areas containing either CDDA data or CD-ROM data written therein. The external memory 16 is more preferably treated as a single memory area. More specifically, for CDDA reproduction, the CDDA data is written into and read from approximately the entire area of the external memory 16, while for MP3 reproduction, CD-ROM data is written into and read from approximately the entire area of the memory 16. Upon switching CDDA and MP3 reproduction, data remaining in the external memory 16 is overwritten by new data, thereby rewriting data therein. Thus, the external memory 16 can be efficiently utilized, and audio data for the period of time corresponding to the capacity of the external memory 16 can be stored. As a result, the anti-shock function can be improved because the player can be resistant to impact for a longer period of time, and a greater amount of data can be used when MP3 data is decompressed, leading to higher decompression efficiency.

Thus, only a single memory is required for connection to an LSI, resulting in reduction in number of external memories, and therefore in number of terminals for the LSI and in a simplified circuit. Because either the CD with MP3 files or the CD with CDDA is employed, the input data is in either one of these formats, and therefore the external memory 16 can be shared for these purposes without problems.

Further, audio output can be achieved either when a CD containing data compressed in MP3 format is reproduced or when a CD containing CDDA data is reproduced. The present invention is applicable not only in MP3 techniques but also in other compression/decompression techniques.

What is claimed is:

1. A signal processing circuit processing a signal reproduced from a CD, comprising:
   a CD-ROM decoder decoding incoming CD-ROM data by using a memory; and
   an anti-shock controller causing a predetermined amount of incoming audio data to be stored in said memory, and reading and outputting the audio data from said memory, so that continuous output can be achieved even when the incoming audio data is interrupted; wherein
   said CD-ROM decoder and said anti-shock controller access said memory; and
   said memory is divided into an area used for decoding the CD-ROM data, and an area where the audio data is stored.

2. A signal processing circuit processing a signal reproduced from a CD in which a CD-ROM data or CD-DA data is written, comprising:
   a memory;
   a CD-ROM decoder writing, when the CD from which the signal is to be reproduced is a CD-ROM, incoming CD-ROM data into said memory, and decoding said CD-ROM data while reading out the CD-ROM data from said memory;

an anti-shock controller causing, when the CD from which the signal is to be reproduced is a CD-DA, a predetermined amount of incoming CD-DA audio data to be stored in said memory, and reading and outputting the audio data from said memory, so that continuous output can be achieved even when the incoming audio data is interrupted;

an MP3 decoder performing MP3 decoding on data encoded in MP3 format and output from said CD-ROM decoder;

a first arbiter generating an output signal for controlling said memory in the order of priority according to a plurality of request signals from said CD-ROM decoder or a readout signal received from the MP3 decoder;

a second arbiter generating an output signal for controlling said memory according to a request signal from said anti-shock controller; and a selection circuit selecting an output signal from said first or second arbiter;

wherein an output signal from said first arbiter is selected by said selection circuit when the CD from which the signal is to be reproduced is a CD-ROM, and, when the CD from which the signal is to be reproduced is a CD-DA, an output signal from said second arbiter is selected by said selection circuit.

3. The circuit according to claim 2 further comprising an MP3 decoder decoding data, encoded in MP3 format and output from said CD-ROM decoder, in MP3 format.

4. The circuit according to claim 3, further comprising a selection circuit selecting either an audio signal received from said anti-shock controller or the data encoded in MP3 format received from said MP3decoder.

5. A signal processing circuit as defined in claim 2, further comprising
an access control circuit outputting to said memory, based on an output signal from said selection circuit, at least an address signal for said memory, a write-enable signal, and a read-enable signal.

6. A signal processing circuit as defined in claim 5, wherein the access control circuit receives as an input address data from one of the CD-ROM decoder and the anti-shock controller.

7. A signal processing circuit as defined in claim 5, wherein a subcode data and an error flag are further recorded in the memory.

8. A signal processing circuit as defined in claim 5, wherein the memory is a DRAM, and the access control circuit allows an RAS signal and a CAS signal to be output from a memory control circuit.

9. A signal processing circuit as defined in claim 5, wherein the signal processing circuit further comprises a refresh counter generating a refresh timing of the memory.

10. A signal processing circuit as defined in claim 2, wherein
when the CD from which the signal is to be reproduced is a CD-ROM, said CD-ROM decoder operates while said anti-shock controller stops operation, and, when the CD from which the signal is to be reproduced is a CD DA, said anti-shock controller operates while said CD-ROM decoder stops operation.

11. A signal processing circuit as defined in claim 2, wherein one of the CD-DA data and the CD-ROM data is supplied to one of the anti-shock controller and the CD-ROM decoder via a data input/output circuit.

12. A signal processing circuit as defined in claim 2, wherein when switching between the CD-DA data and the CD-ROM data, data written before the switching is overwritten by data after the switching.

13. A signal processing circuit as defined in claim 2, wherein the MP3-encoded data is supplied to the MP3 decoder from the memory.

* * * * *